United States Patent
Van Slyke et al.

(10) Patent No.: US 7,232,036 B2
(45) Date of Patent: Jun. 19, 2007

(54) WASTE COLLECTION SYSTEM FOR SEPARATING LIQUID WASTE FROM SOLID WASTE

(75) Inventors: J. Victor Van Slyke, Vancouver (CA); Martien H. J. G. Van Kempen, Leunen (NL); Theodorus A. T. G. Van Kempen, Leefdaal (BE)

(73) Assignee: ATD Waste Systems Inc., Vancouver (CA)

( * ) Notice: Subject to any disclaimer, the term of this patent is extended or adjusted under 35 U.S.C. 154(b) by 0 days.

(21) Appl. No.: 11/201,094

(22) Filed: Aug. 11, 2005

(65) Prior Publication Data

US 2007/0039877 A1 Feb. 22, 2007

(51) Int. Cl.
*B01D 43/00* (2006.01)

(52) U.S. Cl. .................. 210/526; 210/513; 210/160

(58) Field of Classification Search ........... 210/747, 210/767, 780, 800, 154, 160, 163, 164, 170, 210/247, 248, 513, 523, 526, 527, 622, 623; 119/450, 451, 447, 527, 529, 530, 164; 209/184, 209/257, 262, 264, 265

See application file for complete search history.

(56) References Cited

U.S. PATENT DOCUMENTS

| | | | | |
|---|---|---|---|---|
| 1,187,814 | A | * | 6/1916 | Carter .................. 119/451 |
| 3,950,562 | A | * | 4/1976 | Senior .................. 426/431 |
| 4,320,008 | A | * | 3/1982 | Kokubo ................ 210/527 |
| 6,698,383 | B1 | * | 3/2004 | Terwort et al. ......... 119/451 |
| 6,773,594 | B1 | | 8/2004 | Wijngaart |
| 6,916,426 | B2 | | 7/2005 | Van Slyke et al. |

FOREIGN PATENT DOCUMENTS

| | | |
|---|---|---|
| CA | 1101340 | 5/1981 |
| CA | 2098795 | 12/1994 |
| CA | 2345835 | 10/2002 |
| CA | 2354984 | 12/2002 |

(Continued)

OTHER PUBLICATIONS

Bradshaw, S (Jun. 2004) "Harvesting pig manure on a conveyor belt shows promising test results" Better Pork http://betterfarming.com/bp/jun04.htm.

(Continued)

*Primary Examiner*—Krishnan S. Menon
*Assistant Examiner*—Benjamin Kurtz
(74) *Attorney, Agent, or Firm*—Cameron IP

(57) ABSTRACT

According to one aspect of the invention, there is provided a waste collection system for separating liquid waste from solid waste which includes a conveyor having an upper conveyor roller, a lower conveyor roller and an endless conveyor belt extending around the conveyor rollers. The upper run of the conveyor belt is upwardly concave. In cross section, the upper run has a lowermost portion and lateral portions diverging laterally and upwardly from the lowermost portion. The upper run is longitudinally inclined from the upper roller to the lower roller. A waste deflector extends above and along the lowermost portion of the upper run. Separate liquid and solid waste collectors are located in the vicinity of the upper and lower rollers. A conveyor drive is connected to on of the conveyor rollers.

16 Claims, 3 Drawing Sheets

FOREIGN PATENT DOCUMENTS

| | | | |
|---|---|---|---|
| EP | 0518438 | | 12/1992 |
| EP | 0518438 A2 | * | 12/1992 |
| EP | 0 948 888 A1 | | 1/1995 |
| EP | 635205 A1 | * | 1/1995 |
| EP | 0 635 205 A1 | | 10/1999 |
| EP | 0948888 | | 10/1999 |
| EP | 948888 A1 | * | 10/1999 |
| SU | 1805186 | | 3/1993 |

OTHER PUBLICATIONS

Van Kempen, T. (2003) "Re-Cycle: A Profitable Swine Production System with Zero Waste" Advances in Pork Production, vol. 14, pp. 195-204 paragraph bridging pp. 197-198, figures 2 and 3.

Van Kempen, T. (Apr. 2004) "Towards zero waste swin production" London Swine Conference-Building Blocks for the Future http://www.londonswineconference.ca/proceedings/2004/SC2004.TvanKempen.pdf.

* cited by examiner

WASTE COLLECTION SYSTEM FOR SEPARATING LIQUID WASTE FROM SOLID WASTE

BACKGROUND OF THE INVENTION

1. Field of the Invention

The present invention relates to a waste collection system for separating liquid waste from solid waste.

2. Description of the Related Art

In modern agricultural production, it has become usual to employ an agricultural establishment as an intensive feeding operation for raising hundreds or even thousands of animals, e.g. hogs, dairy, poultry and beef animals, at a single location. Consequently, large amounts of animal waste matter are produced at such locations, and the disposal of this waste matter in a hygienic and inoffensive manner can be problematic.

It has, for example, been planned to initiate a hog farm containing 2,000,000 hogs, which will produce an amount of waste equivalent to that produced by the city of Los Angeles. The current pig population of North Carolina is four times that number. Recent accidents in North Carolina, in which millions of gallons of pig excreta were released into the countryside, have drawn attention to the problems involved in the disposal of such waste. Applications for permits to construct large piggeries have been denied because of concerns about odours and waste disposal.

Animal waste, including hog manure, has traditionally been disposed of by spreading it over agricultural land as a liquid fertilizer and, for sufficiently large cropped land bases, this method of disposal can be performed safely. However, in areas of high population density or where multiple farms are closely clustered, and the land base is therefore relatively small, problems arise. For example, excess nutrients cannot be absorbed by crops and leach into ground water and surface water.

When land application is prevented, e.g. because the ground is frozen or saturated with water and/or nutrients, the waste must be stored, usually in large pits, with consequential costs and environmental risk.

As an alternative to land disposal, it is also common practice to compost the waste. For this purpose, the waste is separated into solid and liquid by the use of inclined screens, sometimes followed by the use of belt or filter presses. These methods produce an output containing about 45% solid material at best, and this is then mixed with a bulking material to facilitate aeration and an appropriate C:N ratio, and deposited in windows for stabilization, over a period of about 45 to 60 days, by composting. This process does not ensure that pathogens in the waste are killed and the windrows are often odorous and may attract birds, rodents and vermin. The liquid still has to be dealt with through land application. As such, composting does not reduce the need for land application or land area.

The challenges involved in the treatment of animal waste include the destruction of pathogens, the controlled extraction of ammonium and plant nutrients, and the disposal of organic matter.

It is known to collect waste from animal barns by discharging the waste through openings in the barn floor onto a conveyor belt located in a gutter below the barn floor. The conveyor belt carries the waste to a collection point, and the waste may then be taken to a waste processing facility or the waste may be processed on site.

However, the liquid waste and solid waste are not separated and over time the mixing of liquid waste and solid waste impedes the processing of the waste. Furthermore, the mixing of the liquid waste and solid waste may cause the release of gases which are harmful to humans, animals and the environment.

In the inventor's co-pending U.S. patent application Ser. No. 10/119,719 filed on Apr. 11, 2002, the disclosure of which is herein incorporated by reference, there was disclosed an invention based on an appreciation of the fact that the extraction of nitrogen, potassium and phosphorous from animal waste material is substantially enhanced if the treatment is performed promptly after the production of the waste material by the animals. More particularly, the aforesaid application Ser. No. 10/119,719 disclosed a method of processing animal waste in which liquid waste and solid waste are separated, preferably within 12 hours following the production of the waste by the animals, and the liquid waste is processed preferably within 24 hours of the production of waste by the animals.

More particularly, potassium is present in animal waste material in the form of an insoluble potassium urate, and it was found that a substantial amount of the potassium in animal waste material can be extracted in a solid form, as potassium urate, before microbial action breaks down the potassium urate to leave potassium and ammonium in solution. Extracted urates are then available for inclusion in a fertilizer. When the fertilizer is used on land, the microbes in the soil break down these urates, releasing the potassium and ammonia, but at a rate less than that at which these nutrients would be released in the soil if dissolved in water.

Consequently, by extracting ammonium-nitrogen and potassium in the form of urates and/or other compounds from the waste material while they remain in solid, e.g. crystalline form, i.e. before they break down to release these substances, a substantially improved extraction of these substances can be achieved. Therefore, the solids and liquids should be separated as soon as possible after their production by the animals.

BRIEF SUMMARY OF THE INVENTION

It is therefore an object of the present invention to provide a waste collection system in which liquid waste may be even more rapidly separated from solid waste and collected, following the production of liquid and solid waste by the animals.

According to one aspect of the invention, there is provided a waste collection system for separating liquid waste from solid waste which includes a conveyor having an upper conveyor roller, a lower conveyor roller and an endless conveyor belt extending around the conveyor rollers. The upper run of the conveyor belt is upwardly concave. In cross-section, the upper run has a lowermost portion and lateral portions diverging laterally and upwardly from the lowermost portion. The upper run is longitudinally inclined from the upper roller to the lower roller. A waste deflector extends above and along the lowermost portion of the upper run. Separate liquid and solid waste collectors are located in the vicinity of the upper roller or in the vicinity of the lower roller. A conveyor drive is connected to one of the conveyor rollers.

In operation, animal waste is discharged onto the lateral portions of the upper run. Liquid waste i.e. animal urine, flows into the lowermost portion of the upper run while solid waste remains distributed along the lateral portions. The liquid waste flows along the lowermost portion of the longitudinally inclined upper run of the conveyor to the lower end of the conveyor, where it is collected. The solid waste remains on the lateral portions of the conveyor belt surface until the drive is actuated and the solid waste is carried to an end of the conveyor where it is collected. An air current may also be drawn along the upper run to help dry the solid waste.

In a preferred embodiment of the invention, there is provided a method of separating liquid waste from solid waste using the animal waste conveyor. The conveyor comprises a lower end, an upper end and an endless conveyor belt with an upwardly concave longitudinally inclined upper run. The upper run, has in transverse cross-section, a lowermost portion and lateral portions diverging laterally and upwardly from the lowermost portion. The method comprises the steps of discharging waste onto the upper run while deflecting the solid waste from being discharged onto the lowermost portion of the upper run, and allowing the liquid waste material to flow under gravity into the lowermost portion of the upper run and along the lowermost portion of the upper run. The liquid waste is collected in the vicinity of the lower end of the conveyor. The conveyor is driven to discharge the solid waste material from the conveyor and the solid waste material discharged from the conveyor is collected.

BRIEF DESCRIPTION OF THE DRAWINGS

The invention will be more readily understood from the following description of embodiments thereof given, by way of example only, with reference to the accompanying drawings, in which.

DESCRIPTION OF THE PREFERRED EMBODIMENT

Figure 1:
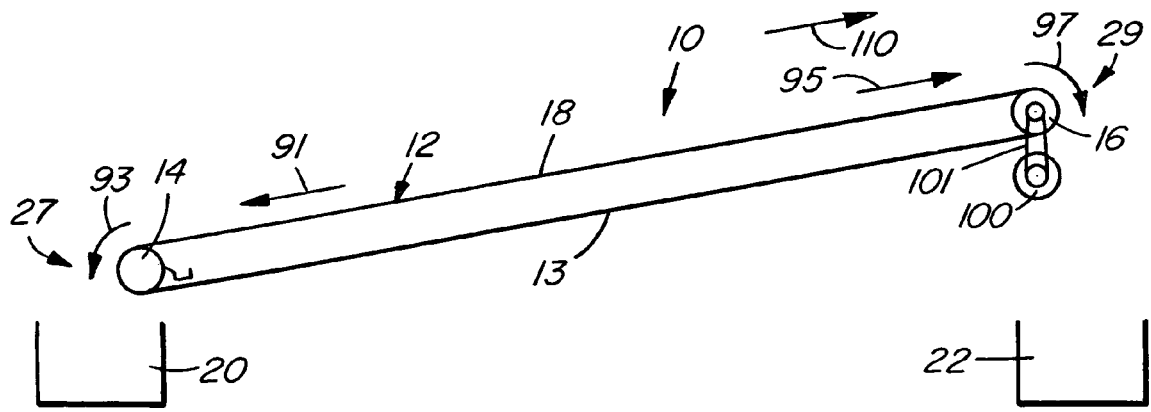
FIG. 1 is a diagrammatic longitudinal view showing a waste collection system according to an embodiment of the invention.

Referring to FIG. 1, there is shown a waste collection system indicated generally by reference numeral 10. In this embodiment of the invention the waste collection system 10 includes a waste material conveyor indicated generally by reference numeral 12. The conveyor 12 comprises an endless imperforate conveyor belt 13 extending around and supported by rollers. The conveyor belt 13 has a upwardly concave upper run 18 which is longitudinally downwardly inclined from an upper, first roller 16 to a lower, second roller 14. There is a liquid waste collector 20 located beneath the conveyor belt 13, in the vicinity of the lower roller 14. There is a solid waste collector 22 located beneath an upper end 29 of the conveyor 12, in the vicinity of the upper roller 16. In this embodiment of the invention the solid waste collector 22 is an upwardly open container or bin. However, in other embodiments of the invention the solid waste collector may alternatively be a second conveyor.

Figure 4:
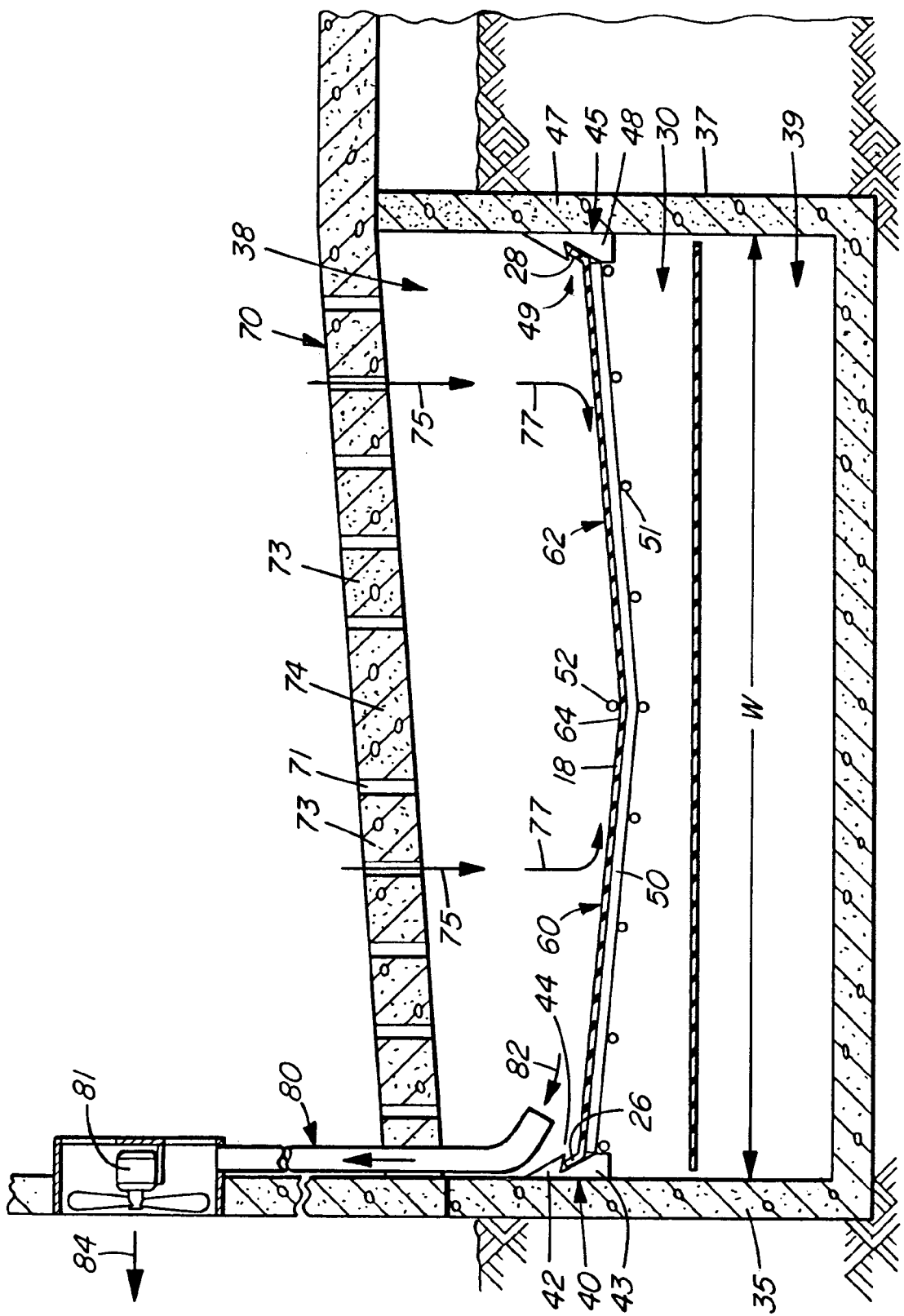
FIG. 4 is a diagrammatic view taken in transverse cross-section through the waste collection system of FIG. 1.

As best shown in FIG. 4, in this embodiment of the invention, the conveyor 12 is located in a gutter 30 underneath an animal barn floor indicated generally by 70. The upper run 18 spans the width W of the gutter 30 and divides the gutter 30 into an upper portion indicated generally by reference numeral 38, and a lower portion indicated generally by reference numeral 39. A first sealing member 40 extends the length of a first gutter wall 35, and a second sealing member 45 extends the length of a second gutter wall 37 which is opposite to the first gutter wall 35. The sealing members 40 and 45 have upper lips 42 and 47, lower lips 43 and 48, and grooves 44 and 49 between the upper lips 42 and 47 and the lower lips 43 and 48, respectively. Opposite longitudinal edges 26 and 28 of the upper run 18 are received by the grooves 44 and 49, respectively, thereby substantially sealing the upper run 18 against the gutter walls 35 and 37 and substantially preventing fluid and air flow between the upper portion 38 and lower portion 39 of the gutter 30.

The upper run 18 rests upon a support, underlying the upper run 18, in the form of a mesh formed by transversely extending support members 50 and longitudinally extending support rods 51, which serve as means for deflecting the upper run of the conveyor belt into an upwardly concave surface in the transverse direction of the upper run 18. More particularly, the support rods 51 are spaced apart in a manner such that the upper run 18 rests in an upwardly concave configuration that is v-shaped in transverse cross-section. The upper run 18 consequently has an upwardly concave surface in the transverse direction of the upper run 18 which has first and second transversely inclined lateral portions indicated generally by reference numerals 60 and 62 which are angularly spaced apart and extend in opposite lateral directions from a lowermost portion 64 of the upper run 18. An elongate member 52, in the form of a cable, rests on the lowermost portion 64 of the upper run 18 and extends longitudinal along the lowermost portion 64 of the upper run. The elongate member 52 guides the flow of liquid waste along the lowermost portion 64, which thus forms a longitudinally inclined liquid drainage channel extending longitudinally of the upper run 18.

An air extraction ductwork 80 communicates with the upper run 18 and has an extractor fan 81 which draws an air current over the conveyor belt and out of the gutter 30, as indicated generally by arrows 82 and 84.

The barn floor 70 has a plurality of animal waste discharge openings in the form of slots 71 separated by solid portions of flooring 73 and 74. The slots 71 directly expose areas of the upper run 18 to the barn environment. The solid portions 73 and 74 cover areas of the upper run 18 from direct exposure to the barn environment.

This embodiment of the waste collection system functions as follows:

Referring to FIG. 4, waste is discharged from the barn through the slots 71 in the barn floor 70 and onto the upper run 18 as indicated generally by arrow 75. However, the flooring portion 74, which is wider than the flooring portion 73, forms a waste deflector 74 which extends longitudinally of the upper run 18 and is spaced above and covers the lowermost portion 64 from the deposit of falling solids. The flooring portion 74 covers the lowermost portion 64 of the upper run 18, and deflects the waste from falling through the floor 70 onto the lowermost portion 64 of the upper run. The waste is therefore discharged solely onto the lateral portions 60 and 62 of the upper run 18.

Figure 5:
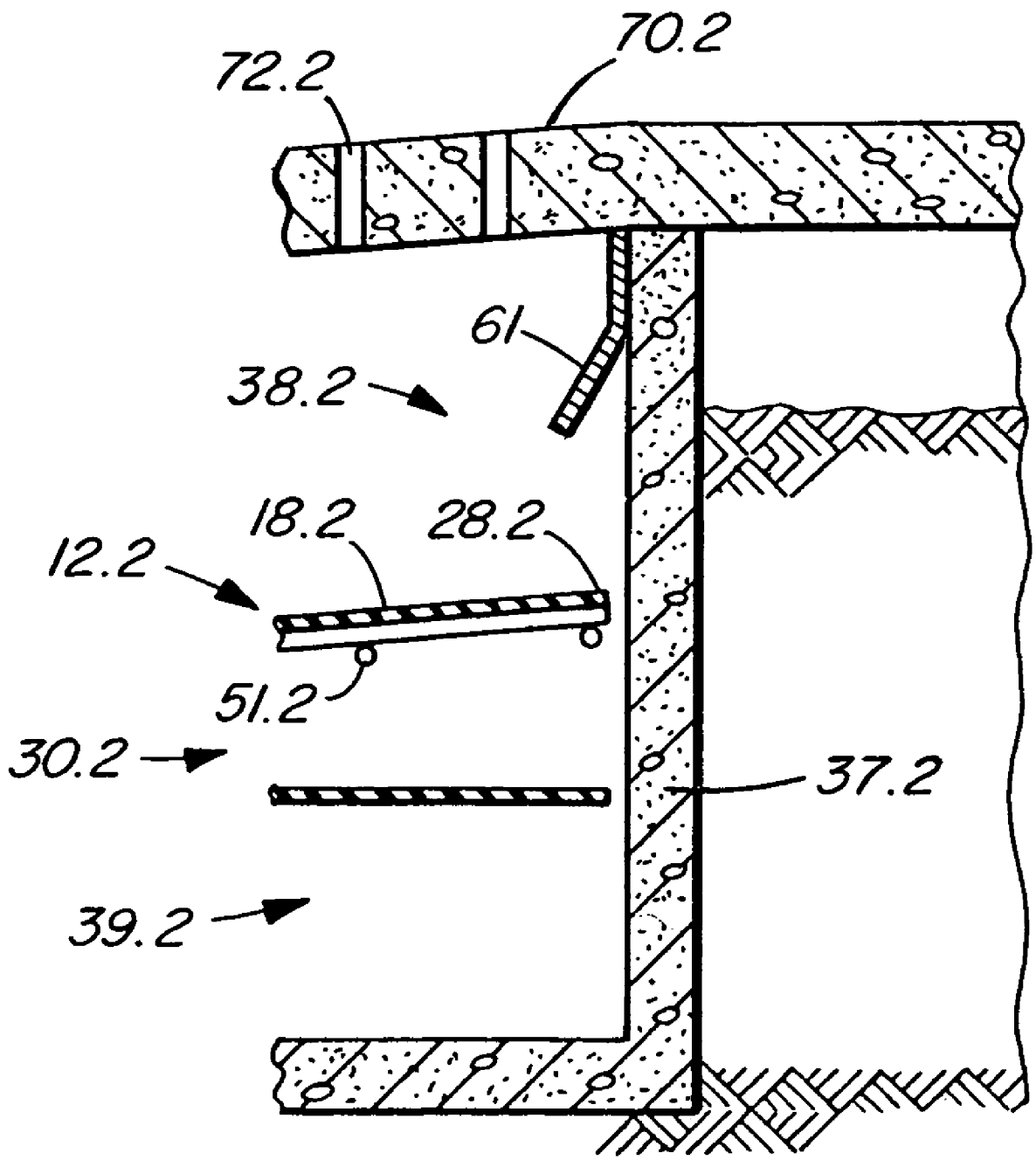
FIG. 5 is a fragmentary diagrammatic view taken in transverse cross-section through a waste collection system according to yet another embodiment of the invention.

In this embodiment of the invention, the upper lips 42 and 47 of the sealing members 40 and 45 substantially prevent waste from being discharged downwardly past the edges 26 and 28 of the upper run 18. As will be apparent to those skilled in the art, it is alternatively possible to employ, in other embodiments of the invention, flashings such as flashing 61 shown in FIG. 5, to prevent waste from being discharged downwardly past the edges of the upper run 18.

Referring back to FIG. 4, the lateral portions 60 and 62 of the upper run 18 are laterally upwardly inclined relative to the lowermost portion 18, with a slope of between 2% and 6% and preferably 4%. This slope causes the liquid waste to flow across the lateral portions 60 and 62 into the lowermost portion 64 as indicated by arrow 77. The solid waste remains distributed along the lateral portions 60 and 62 of the upper run 18. As a result, this embodiment of the invention offers the advantage of rapid separation of the liquid waste from the solid waste.

Referring now to FIG. 1, because the upper run 18 of the conveyor 12 is longitudinally inclined, preferably with a longitudinal slope of between 0.1% to 2.0%, the liquid waste flows along the lowermost portion 64 of the upper run 18 to the lowermost end 27 of the conveyor 12 as indicated generally by arrow 91. At the lowermost end 27 of the conveyor 12, the liquid waste is discharged from the conveyor 12 as indicated by arrow 93 and collected in the liquid waste collector 20. As a result, this embodiment of the invention ensures rapid and substantially immediate separation of the liquid waste from the solid waste and continuous collection of the liquid waste.

The conveyor 12 generally remains stationary as the liquid waste is collected, thereby allowing the solid waste to dry in a fixed position for a desired period of time. In this embodiment of the invention, an air current drawn across the upper run 18 by the extration fan 81 accelerates this drying process. After the solid waste has been allowed to dry for a desired period of time, the conveyor 12 is driven by a drive motor 100 connected by a belt and pulley connection 101 to the upper roller 16 at the uppermost end 29 of the conveyor 12 for driving the conveyor 12 in the direction generally indicated by arrow 110. The solid waste is thus carried along the conveyor 12 to the uppermost end 29 of the conveyor 12 where it is discharged from the conveyor 12 into the solid waste collector 22. Movement of the solid waste along and from the conveyor 12 is indicated generally by arrows 95 and 97.

Figure 2:
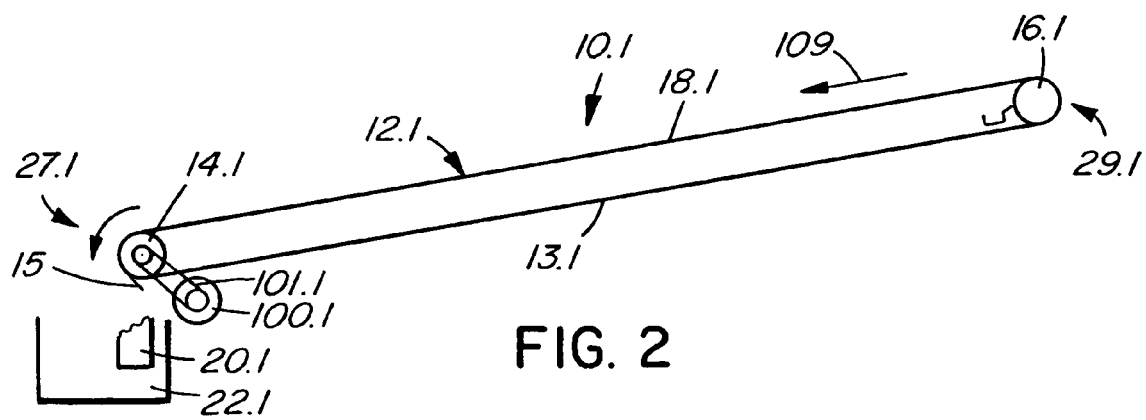
FIG. 2 is a diagrammatic longitudinal view showing a waste collection system according to another embodiment of the invention.

Now referring to FIG. 2, wherein parts corresponding to those of FIGS. 1 and 4 have been given like reference numerals with the additional numerical designation "0.1", a waste collection system is shown according to another embodiment of the invention. The waste collection system is indicated generally by reference numeral 10.1, which includes a conveyor 12.1 having a lowermost end 27.1 and an uppermost end 29.1 and an endless belt 13.1 having an upper run 18.1 which is longitudinally downwardly inclined from an upper roller 16.1 at the uppermost end 29.1 to a lower roller 14.1 at the lowermost end.

Figure 3:
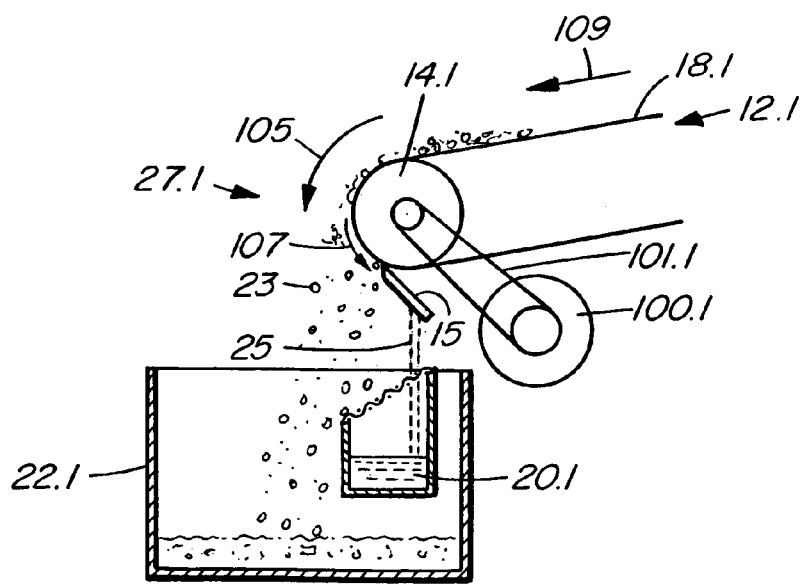
FIG. 3 is an enlarged diagrammatic side view, partly in cross-section, showing the lower end of the conveyor of the waste collection system of FIG. 2.

As shown best in FIG. 3, in this embodiment of the invention, a liquid waste collector 20.1 and a solid waste materials collector 22.1 are located beneath the lowermost end 27.1 of the conveyor 12.1. The liquid waste collector 20.1 is within the solid waste collector 22.1. A scraper 15 acts on the lowermost end 27.1 of the conveyor belt 12.1. A drive motor 100.1 is connected by a belt and pulley connection 101 to the lower roller 14.1 at the lowermost end 27.1 of the conveyor 12.1 for driving the conveyor 12.1 in the direction generally indicated by arrow 109.

In this embodiment of the invention, both liquid waste 25 and solid waste 23 are conveyed to the lowermost end 27.1 of the conveyor 12.1. The liquid waste 25 flows around the lowermost end 27.1 of the conveyor 12.1, as indicated generally by arrow 107, and is deflected into the liquid waste collector 20.1 by the scraper 15. When the conveyor 12.1 is intermittently driven by drive motor 100.1 solid waste from the lowermost end 27.1 of the conveyor 12.1 falls, as indicated generally by arrow 105, into the solid waste collector 22.1.

As will be apparent to those skilled in the art, various modifications may be made in the above-described embodiment of the present invention within the scope of the appended claims.

We claim:

1. A waste collection system for separating liquid and solid waste, comprising:
   first and second rollers;
   an animal waste conveyor including an endless imperforate conveyor belt supported by the first and second rollers;
   said belt having an upper run longitudinally downwardly inclined from the first roller to the second roller;
   means for deflecting the upper run of the conveyor belt into an upwardly concave surface in the transverse direction of the upper run;
   said concave surface having first and second laterally inclined portions connected by a lowermost portion and the lowermost portion forming a longitudinally inclined liquid drainage channel extending longitudinally of the upper run;
   a waste deflector extending longitudinally along the upper run, the waste deflector being spaced above and covering the lowermost portion of the conveyor belt from the deposit of falling solids;
   a liquid waste collector located beneath the conveyor belt in the vicinity of the second conveyor roller;
   a solid waste collector located beneath one of the first and second conveyor rollers; and
   a conveyor drive connected to one of the first and second conveyor rollers.

2. A waste collection system as claimed in claim 1, wherein the upper run of the conveyor belt has a longitudinal slope of 0.1% to 2.0%.

3. A waste collection system as claimed in claim 2, wherein the lateral portions of the upper run of the conveyor belt each have a slope, transversely of the upper run, of 2.0% to 6.0%.

4. A waste collection system as claimed in claim 1, wherein the lateral portions of the upper run of the conveyor belt each have a slope, transversely of the upper run, of 2.0% to 6.0%.

5. A waste collection system as claimed in claim 4, wherein the lateral portions of the upper run of the conveyor belt each have a slope, transversely of the upper run, of 4%.

6. A waste collection system as claimed in claim 1, wherein an elongate member extends on and along the lowermost portion of the upper run of the conveyor belt.

7. A waste collection system as claimed in claim 6, wherein the elongate member comprises a cable.

8. A waste collection system as claimed in claim 1, including a floor extending above the conveyor, the floor having openings extending downwardly and through the floor to allow the liquid and solid wastes to fall through the floor onto the upper run of the conveyor.

9. A waste collection system as claimed in claim 8, wherein the waste deflector comprises a portion of the floor which is uninterrupted by the openings and which extends along and above the lowermost portion of the upper run on the conveyor belt.

10. A waste collection system as claimed in claim 1, wherein the solid waste collector is located in the vicinity of the upper conveyor roller and the liquid waste collector is located in the vicinity of the lower conveyor roller.

11. A waste collection system as claimed in claim 1, wherein the liquid and solid waste collectors are both located in the vicinity of the lower conveyor roller.

12. A waste collection system as claimed in claim 11, wherein the liquid waste material collector comprises an upwardly open container and an inclined solid waste material deflector screen extending over the upwardly open container.

13. A waste collection system as claimed in claim 1, including a scraper contacting the conveyor.

14. A waste collection system as claimed in claim 1, including a gutter containing the conveyor, the gutter having opposed walls and the conveyor being located between the opposed walls, and a sealing means for sealing opposite edges of the upper run against the opposed walls.

15. A waste collection system as claimed in claim 1, including a flashing preventing the liquid and solid waste from being discharged downwardly past the opposite edges of the upper run.

16. A waste collection system as claimed in claim 1, including an air extracting ductwork communicating with the upper run of the conveyor.

* * * * *